United States Patent Office 3,386,513
Patented June 4, 1968

3,386,513
RECOVERY OF VISCOUS CRUDE BY
FLUID INJECTION
Billy G. Holmes, Lancaster, Tex., assignor to Mobil Oil
Corporation, a corporation of New York
No Drawing. Filed Apr. 20, 1965, Ser. No. 449,612
12 Claims. (Cl. 166—42)

ABSTRACT OF THE DISCLOSURE

A method for recovering oil from a formation having a low permeability to fluids, significant porosity and amounts of in-place oil, existing fractures and a finite gas saturation without a useful gas drive. Light hydrocarbon, in a liquid state, is injected from a well into the formation, without creating fractures, in an amount to fill up existing fractures, and then an additional amount not in excess of the gas saturation volume of the formation within the well's drainage radius exposed to the hydrocarbon. The well is shut in until the bottom hole pressure decline ceases for obtaining matrix invasion of the hydrocarbon in the formation. Thereafter, the hydrocarbon is produced with oil, in a liquid state, from the well. Oil is then removed from this produced fluid. By these steps, the liquid hydrocarbon is interspersed with the oil in the formation for ready co-production of these fluids. The reservoir geometery about the well is unchanged. Only the pressure distribution and fluid saturation are altered, but only in a manner that no oil bank is formed which would require a prolonged miscible displacement with a liquid or gas for its recovery.

This invention relates to the recovery of crude oil from a subterranean formation. More particularly, it relates to a method for the recovery of oil from a subterranean formation by the injection of a liquid hydrocarbon.

There are vast amounts of oil contained in subterranean formations whose natural characteristics are such that only a small portion of their oil may be recovered during primary production. Additionally, these characteristics of the formations make the conventional secondary recovery of the oil very difficult, and usually impractical. One of the characteristics is that the formation matrix is relatively "tight." More particularly, the formation will have a permeability usually less than 1 millidarcy to gases although it may have a relatively high porosity. Additionally, fluid saturations in the pores are also high, including interstitial water, oil, and gas volumes. Although the gas saturation is finite, it nevertheless is inadequate to provide a gas drive for producing the oil in acceptable quantities. These formations, especially those having thick productive sections, contain a tremendous amount of in-place oil. However, the crude oil recovered by primary recovery methods is only a fraction, possibly one-tenth of the total in-place amount.

Another characteristic resides in fractures which lace these formations. Attempts have been made to employ known oil-displacement procedures for the secondary recovery of the oil by fluid injection through the formation between injection and production wells. However, when suitable injection pressures were established for moving the fluid at operable rates through the formation matrix, the initial fractions were extended and interconnected. As a result, severe by-pass channeling of the injected fluid occurred through the fractures and only very small amounts of oil were displaced to a location where it could be recovered. It appears that the gas saturation in the pores of the formation hinders such action. For example, water injection does not appear to be satisfactory in displacing oil from the formation matrix. It is believed that the gas blocks the oil's displacement by the injected water from within the pores of the formation matrix.

It has also been thought at one time that increased recoveries of oil from a formation, without existing fractures to by-pass fluids, could be effected merely by injecting a batch of liquid hydrocarbon from a well at below fracturing pressures and then producing the well. The purpose of such injection was for diluting or otherwise commingling, or contacting, the in-place oil in the formation's matrix with a liquid but highly mobile hydrocarbon, such as cutterstock, or other low viscosity petroleum fraction. Tests are reported, however, that demonstrate that injecting a batch of a low viscosity hydrocarbon into an underground formation for the purpose of effecting later the increased recovery or production of the oil from the same well is ineffectual. The backflow of the low viscosity hydrocarbon apparently cannot produce an observable increase in the production rate of the in-place more viscous oil above that which was expected under primary recovery conditions. This has been explained on the basis that there is substantially a complete absence of diffusion or mixing between the injected low viscosity hydrocarbon and the in-place viscous crude even though a substantial contact time may exist. The injected hydrocarbon evidently, by miscible displacement, created an oil bank which merely moved initially before, and later behind, the injected hydrocarbon. Under these conditions, the viscosity of the oil and the low relative permeability of the formation's matrix to this oil make fluid displacement a slow and extended procedure for recovering the oil. Any injection of hydrocarbon which increases the gas saturation of the matrix of the formation further undesirably reduces the permeability of the matrix to the oil.

The method of the present invention employs for the improved recovery of oil, the injection under certain conditions of a quantity of light hydrocarbon in a liquid phase from a well into a subterranean formation of the character described. After a regulated confinement of the injected hydrocarbon in the formation, the well through which the hydrocarbon was injected is placed on production. The produced light hydrocarbon, in a liquid state, co-produces the oil from the formation through such well. Thereafter, the oil is recovered from the light hydrocarbon. The particular conditions under which these steps are practiced can produce in certain instances about one volume of oil for each volume of the light hydrocarbon injected into the subterranean formation which invades the formation's matrix.

Therefore, it is a principal object of the present invention to provide a method with novel steps for the injection of a quantity of a light hydrocarbon in a liquid state from a well into a subterranean formation of the character described and, after confinement therein, such hydrocarbon is produced through the well with suitable recovery of the co-produced oil. Another object is to provide for the recovery of oil from a subterranean formation of the character wherein the secondary recovery of such oil by displacement of oil through fluid injection between spaced wells is difficult and unsatisfactory. Another object is to provide a method for employing a light hydrocarbon which is injected into the described formations under novel conditions whereby increased quantities of the oil may be recovered without the difficulties experienced in the past. These and further objects will become more apparent when considered in conjunction with the following detailed description of a preferred embodiment of the present invention and the appended claims.

The method of this invention is especially suited for use in a subterranean oil-bearing formation characterized by a matrix having a large porosity with a high saturation of oil, gas, and water volumes and a low permeability to gases, such as air, and wherein there exists fractures. Although the gas saturation is finite, insufficient gas drive exists to make the production of oil significant. In formations of this character and as previously described, known procedures employing a driving fluid, miscible or immiscible, injected continuously from an injection well for displacing the oil to a production well for its recovery are unsatisfactory.

This invention is well suited for employment in a subterranean oil-bearing formation of the character described especially in a formation having the characteristics of the Annona Chalk formation in the Pine Island Field, Caddo Parish, La. This particular formation is a very dense oolitic limestone usually occurring at approximately 1350' to 1550'. It produces from a relatively large horizontal area and averages 150' in thickness. The porosity is about 23 percent but the permeability to natural gas is only about 0.8 millidarcy or less in this formation. The fluid saturation within the pores of the formation's matrix is unusually high. The interstitial water content is great, being about 50 percent (by volume). The oil and gas saturation volumes are about 35 and 15 percent (by volume), respectively. The good porosity, high fluids content, and very thick productive section indicate that there is originally a tremendous amount of oil in-place. It is estimated that only 10–12 percent of in-place oil will be recovered by primary recovery procedures since no significant gas drive exists. In addition to these properties, fractures communicate with each well but these fractures usually are not interconnected to any regional fracture system. For example, there may be a vertical fracture in the interval from 1425' to 1450' at a well. It is possible that this fracture may extend up to several thousand feet from the well and present a fracture area of from several tens square feet to a fraction of a million square feet of exposed surface. The fractures may be natural or induced by hydraulic fracturing which occurs during the drilling of a well, or for other reasons. Additionally, the maximum wellbottom pressure in this formation usually should not exceed about 850–1000 lbs., otherwise fracturing of the formation, or the extension of existing fractures, will occur. Thus, the stated conditions of this formation severely limit the application of conventional secondary recovery procedures wherein is employed the continuous injection of a crude oil displacing fluid. Up to the present, the normal secondary recovery procedures for oil displacement employing continuous fluid injection, such as natural gas or water, from one well toward a production well have been considered relatively unsuccessful for the production of the in-place oil.

In a formation having the mentioned characteristics, as for example the Annona Chalk formation, the steps of the present invention are practiced through a well. More particularly, a well is provided in any manner into such formation in communication with the fractures extending outwardly therefrom. The well is prepared for the injection of fluid from the earth's surface into such formation; and then at a later time, for the removal of such injected fluid along with the co-produced oil from the formation with transmittal of these produced fluids to the earth's surface for the recovery of the oil. Any suitable structures may be employed for this purpose and the present invention is not limited by any of the structures which may be employed.

The method of the present invention is now practiced with the well available for the injection and production of fluid. As a first step, a batch of light hydrocarbon is injected from the well into the subterranean oil-bearing formation. The light hydrocarbon is selected from the group consisting of propane, butane, and mixtures thereof, and may be from any source. Preferably, the light hydrocarbon is propane in view of its good solvency for oil, ease of separation from the oil and moderate vapor pressure. The batch of light hydrocarbon is passed radially outwardly from the well into the adjacent formation under injection conditions with sufficient pressure, at the reservoir temperatures, that the light hydrocarbon is maintained in a liquid state.

The amount of the light hydrocarbon in such injected batch should be in an amount to fill the existing fractures in fluid communication with the well. This amount may be determined beforehand by various techniques which include the injection of a fluid under monitored conditions where pressure build-ups and draw-downs provide an indication of the fracture volume. Other methods of determining fracture volume may be used if desired. Another means to determine the existing fracture volume in fluid communication with the well to be filled with the light hydrocarbon is by observing the pressure build-up within the well. More particularly, the light hydrocarbon may be injected until the static pressure of fluid in the well adjacent the formation is about equal to the reservoir pressure prior to the injection of the light hydrocarbon. This static pressure may be monitored by observing the wellhead pressure since the standing column of liquid hydrocarbon in the well produces a certain pressure which may be readily subtracted from the wellhead pressure in order to determine the bottom hole pressure in the well.

After the light hydrocarbon is introduced in an amount to fill the existing fractures in fluid communication with the well, an additional amount of light hydrocarbon is introduced thereafter through the well into the formation. This additional amount of light hydrocarbon should be not in excess of an amount equal to the gas saturation in the pore volume of the formation's matrix exposed to said light hydrocarbon. The injection pressure for introducing this additional amount of light hydrocarbon should not cause fracturing of the formation. Particularly, during introduction of this additional amount of light hydrocarbon, the extension of fractures into fluid interconnection with any regional fracture trend should be avoided to minimize losses of the fluids outside the drainage area about the well. The light hydrocarbon can be injected into the formation in the latter additional amount under a constant pressure where the fluid pressure in the well does not exceed the maximum pressure which can be obtained without danger of fracturing the formation. Alternatively, the light hydrocarbon can be injected from the well into the formation at a constant rate of injection and the well pressure monitored so that as the bottom hole pressure approaches the maximum pressure previously defined the rate of injection of the light hydrocarbon may be reduced or terminated in order to avoid fracturing problems.

If desired, the step of injecting light hydrocarbon may be to introduce this fluid in such an amount to make the static pressure of the well adjacent the formation equal to the reservoir pressure prior to the injection of this fluid with an additional amount of light hydrocarbon sufficient to effect a change in the pressure distribution and fluid saturations within the drainage area of the well without changing the reservoir geometry, as for example by fracturing.

It is apparent, by the described injection step, that the injected light hydrocarbon is contained not only within the existing fractures in fluid communication with the well but also penetrates a certain distance into the formation's matrix. Additionally, the reservoir geometry of the formation within the drainage area of the well will remain unchanged and only the pressure distributions and fluid saturations will have been altered by injecting the liquid hydrocarbon. Under these conditions, the light hydrocarbon in a liquid phase does not create a crude oil bank within the matrix which it penetrates but intersperses with the crude oil within such matrix. Also, the relative permeability of the matrix to oil is not appreciably changed by any increase in gas saturation. Thus, since no oil bank is created, the liquid flow of the light hydrocarbon and infused oil is controlled by the light hydrocarbon and oil mixture viscosities and the relative permeability of the formation's matrix to such light hydrocarbon-oil mixtures in determining the rate and pressure of moving the light hydrocarbon-oil mixtures from the formation's matrix and then through the existing fractures into the well. After the additional volume of light hydrocarbon equal in amount to at least a part of the gas saturation volume of the formation's matrix has been injected into the formation, the steps of the present method may be continued.

As the next step, the injected batch of light hydrocarbon is maintained in the formation in a liquid state by shutting in the well for an interval of time until there is substantial matrix invasion of light hydrocarbon in the formation. One means for determining the matrix invasion is to observe the pressure decline of the fluid within the well toward an equilibrium value. One week of well shut-in is usually satisfactory. The light hydrocarbon at high injection rates after injection may have temporarily displaced a small amount of the oil and water from the pores in the matrix into larger openings. This displacement of liquids can increase to a degree the gas saturation in the pores of the formation's matrix which in effect would reduce its relative permeability to oil. This displacement would, if persistent, curtail immediate and extended oil production. By shutting in the well, any initial displacement action is modified in time to restore near the original gas saturation values. When the pressure decline within the well reaches about an equilibrium value, optimum matrix invasion and diffusion of the light hydrocarbon in the reservoir oil have been obtained. At such time the well can be placed on production.

As the next step, the injected light hydrocarbon is produced, in a liquid phase, from the formation by opening the previously shut-in well to a recovery sytem. Preferably, the recovery system is held at a back pressure in the well and adjacent the formation sufficient that the light hydrocarbon is produced as a liquid phase until an insufficient magnitude of driving energy exists in a formation to produce acceptable quantities of the oil. The production of the light hydrocarbon-oil mixture from the formation as a liquid phase may be effected by other means such as by pumping to supplement the driving energy of the light hydrocarbon residing in the formation.

The light hydrocarbon which is produced from the well is now treated in suitable equipment for recovering the coproduced oil. For example, conventional flash separators may be employed for this purpose for recovering the oil from the light hydrocarbon. The light hydrocarbon can be recovered by other means and then also reinjected, if desired.

The preceding steps may be repeated one or more times until a substantial recovery of the oil from the formation is obtained.

It will be apparent that the method of this invention can be employed through separate, spaced-apart wells in either the simultaneous, concurrent, or alternating practice of its steps. Additionally, once a substantial quantity of oil is recovered from the formation between spaced wells, then this formation may be swept by a conventional displacement fluid, miscible or immiscible, to drive the remaining oil from one well into the other of the wells. Other variations in use of the described steps may be also employed to great utility.

It will be readily appreciated from the foregoing description that herein is fully disclosed a novel method well adapted to obtain optimum recovery of hydrocarbons from underground formations and to obtain such hydrocarbons economically, and that this method may be used extensively as a means to produce vast quantities of hydrocarbons.

It will be understood that certain features and subcombinations are of utility and may be employed without reference to other features and subcombinations. This is contemplated by and is within the scope of the claims.

As many embodiments as possible may be made of the invention without departing from the scope thereof. It is to be understood that all matter herein set forth is to be interpreted as illustrative and not in a limiting sense.

What is claimed is:

1. A method for recovering oil from a subterranean formation containing oil in commercial quantities and characterized by having a permeability not in excess of one millidarcy and a finite gas saturation but lacking in gas drive, said formation being provided with a well extending thereto from the surface of the earth, and said well being in fluid communication with fractures extending into said formation, the steps comprising:

(a) injecting from said well a batch of a light hydrocarbon selected from the group consisting of propane, butane, and mixtures thereof, radially outwardly into said formation under injection conditions of sufficient pressure at reservoir temperatures that said light hydrocarbon is in a liquid state, and the amount of said light hydrocarbon being the amount to attain a static pressure of fluid in said well adjacent said formation equal to the reservoir pressure in said formation prior to injection of said light hydrocarbon plus an amount not in excess of the gas saturation volume within the portion of said formation exposed to said light hydrocarbon, said latter amount of light hydrocarbon being injected at a pressure insufficient to cause fracturing in said formation, (b) maintaining the injected light hydrocarbon in the formation by shutting in said well for an interval of time until the pressure decline of fluid in the well indicates matrix invasion of the light hydrocarbon in the formation, (c) producing after the shut-in time the light hydrocarbon in a liquid phase from the formation by opening said well to a recovery system until an insufficient magnitude of driving energy exists in the formation to produce acceptable quantities of the oil, and (d) recovering from said liquid phase oil co-produced with said light hydrocarbon.

2. The method of claim 1 wherein steps (a), (b), (c), and (d) are repeated.

3. The method of claim 1 wherein the light hydrocarbon is propane.

4. A method for recovering oil from a subterranean formation containing oil in commercial quantities and characterized by having a permeability not in excess of one millidarcy and a finite gas saturation but lacking in gas drive, said formation being provided with a well extending thereto from the surface of the earth, and said well being in fluid communication with fractures extending into said formation, the steps comprising:

(a) injecting from the well a batch of a light hydrocarbon selected from the group consisting of propane, butane, and mixtures thereof, radially outwardly into the formation under injection conditions of sufficient pressure at reservoir temperatures that such light hydrocarbon is in a liquid state, and the amount of said light hydrocarbon being the amount to fill the existing fractures in fluid communication with the well and at least an additional amount not in excess of the gas saturation volume within the portion of the formation exposed to said light hydrocarbon, said latter amount of light hydrocarbon being injected at a pressure insufficient to cause fracturing in said formation, (b) maintaining the injected light hydrocarbon in the formation by shutting in said well for an interval of time until there is matrix invasion of light hydrocarbon in the formation, (c) producing after the shut-in time the light hydrocarbon from the formation at a bottom hole pressure adjacent the formation sufficient with existing well conditions that the light hydrocarbon is produced in a liquid phase into the well, and (d) recovering from the light hydrocarbon the co-produced oil.

5. The method of claim 4 wherein steps (a), (b), (c), and (d) are repeated.

6. The method of claim 4 wherein the light hydrocarbon is propane.

7. A method for recovering oil from a subterranean formation containing oil in commercial quantities and characterized by having a permability not in excess of one millidarcy and a finite gas saturation but lacking in gas drive, said formation being provided with a well extending thereto from the surface of the earth, and said well being in fluid communication with fractures extending into said formation, the steps comprising:

(a) injecting from the well a batch of a light hydrocarbon selected from the group consisting of propane, butane, and mixtures thereof, radially outwardly into the formation under injection conditions of sufficient pressure at reservoir temperatures that such light hydrocarbon is in a liquid state, and the amount of said light hydrocarbon being the amount to fill the existing fractures in fluid communication with the well and an additional amount not in excess of the gas saturation volume within the portion of the formation exposed to said light hydrocarbon with said additional amount being equal to the production of oil to be effected by the injection of said light hydrocarbon, said latter amount of light hydrocarbon being injected at a pressure insufficient to cause fracturing in said formation, (b) maintaining the injected batch of light hydrocarbon in the formation by shutting in said well for an interval of time until there is matrix invasion of light hydrocarbon in the formation, (c) producing after such shut-in time the injected light hydrocarbon from the formation as a liquid phase into the well, and (d) recovering from the light hydrocarbon the co-produced oil.

8. The method of claim 7 wherein steps (a), (b), (c), and (d) are repeated.

9. The method of claim 7 wherein the light hydrocarbon is propane.

10. A method for recovering oil from a subterranean formation containing oil in commercial quantities and characterized by having a permeability not in excess of one millidarcy and a finite gas saturation but lacking in gas drive, said formation being provided with a well extending thereto from the surface of the earth, and said well being in fluid communication with fractures extending into said formation, the steps comprising:

(a) injecting from the well a batch of a light hydrocarbon selected from the group consisting of propane, butane, and mixtures thereof, radially outwardly into the subterranean oil-bearing formation under injection conditions of sufficient pressure at reservoir temperatures that such light hydrocarbon is in a liquid state, and the amount of said light hydrocarbon being the amount sufficient to make the static pressure of the well adjacent the formation about equal to the reservoir pressure in the formation prior to injection of the light hydrocarbon with an additional amount sufficient to effect a change in the pressure distribution and fluid saturations within the drainage area of the well but with the reservoir geometry in such area remaining unchanged, said latter amount of light hydrocarbon being injected at a pressure insufficient to cause fracturing in said formation, (b) maintaining the injected light hydrocarbon in the formation for an interval of time until the matrix of that portion of the formation becomes invaded by the light hydrocarbon to intersperse with the oil therein, (c) producing after such shut-in time the light hydrocarbon from the formation as a liquid phase into the well, and (d) recovering from the light hydrocarbon the co-produced oil.

11. The method of claim 10 wherein steps (a), (b), (c), and (d) are repeated.

12. The method of claim 10 wherein the light hydrocarbon is propane.

References Cited
UNITED STATES PATENTS

| | | | |
|---|---|---|---|
| 2,412,765 | 12/1946 | Buddrus et al. | 166—2 X |
| 2,669,306 | 2/1954 | Teter et al. | 166—9 |
| 2,699,832 | 1/1955 | Allen | 166—42 |
| 2,718,262 | 9/1955 | Binder | 166—9 |
| 2,909,224 | 10/1959 | Allen. | |
| 3,064,728 | 11/1962 | Gould | 166—11 X |
| 2,998,066 | 8/1961 | Nixon | 166—41 |
| 3,123,134 | 3/1964 | Kyte et al. | 166—2 |
| 3,126,951 | 3/1964 | Santourian. | |
| 3,252,512 | 5/1966 | Baker et al. | 166—2 |
| 3,266,569 | 8/1966 | Sterrett | 166—2 |

CHARLES E. O'CONNELL, *Primary Examiner.*

I. A. CALVERT, *Assistant Examiner.*